United States Patent
Sawada et al.

(10) Patent No.: US 12,351,204 B2
(45) Date of Patent: Jul. 8, 2025

(54) MONITORING SYSTEM, STORAGE MEDIUM STORING COMPUTER PROGRAM FOR MONITORING AND METHOD FOR MONITORING

(71) Applicant: TOYOTA JIDOSHA KABUSHIKI KAISHA, Toyota (JP)

(72) Inventors: Takeshi Sawada, Tokyo-to (JP); Jiro Fujino, Tokyo-to (JP); Kenichiroh Hara, Yokohama (JP); Satoru Kawakami, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/224,303

(22) Filed: Jul. 20, 2023

(65) Prior Publication Data

US 2024/0124013 A1    Apr. 18, 2024

(30) Foreign Application Priority Data

Oct. 14, 2022    (JP) .................. 2022-165460

(51) Int. Cl.
  *B60W 50/16*    (2020.01)
  *B60W 40/08*    (2012.01)

(52) U.S. Cl.
  CPC ............ *B60W 50/16* (2013.01); *B60W 40/08* (2013.01); *B60W 2540/223* (2020.02); *B60W 2540/227* (2020.02)

(58) Field of Classification Search
  CPC .................. B60W 50/16; B60W 40/08; B60W 2540/223; B60W 2540/227
  See application file for complete search history.

(56) References Cited

U.S. PATENT DOCUMENTS

| | | | |
|---|---|---|---|
| 2007/0018445 A1* | 1/2007 | Inuzuka | B60R 22/44 280/806 |
| 2016/0159251 A1* | 6/2016 | Ebina | B60N 2/22 701/49 |
| 2017/0197523 A1* | 7/2017 | Magaña | B60N 2/0273 |
| 2017/0267124 A1* | 9/2017 | Numazawa | B60N 2/0244 |
| 2019/0337451 A1* | 11/2019 | Bacchus | B60K 35/28 |
| 2021/0188324 A1 | 6/2021 | Kim et al. | |
| 2021/0291875 A1* | 9/2021 | Ogura | G06V 20/593 |
| 2022/0063633 A1* | 3/2022 | Moriya | G06F 3/167 |
| 2023/0001930 A1* | 1/2023 | Moidunny | A61B 5/1116 |

FOREIGN PATENT DOCUMENTS

| | | |
|---|---|---|
| JP | 2009-126209 A | 6/2009 |
| JP | 2017-094963 A | 6/2017 |
| JP | 2017-154590 A | 9/2017 |

* cited by examiner

*Primary Examiner* — Mohamed Barakat
(74) *Attorney, Agent, or Firm* — Oliff PLC

(57) ABSTRACT

A monitoring system has a notifying unit capable of notifying a driver of information in a tactually recognizable manner, and a processor configured to determine whether a seat position of a driver's seat in which a driver is sitting is within a recommended range that represents an extent of the seat position where the driver sitting in the driver's seat can drive a vehicle, and notify the driver of a move request requiring to adjust the seat position within the recommended range through the notifying control unit based on the determination that the seat position is not within the recommended range.

7 Claims, 5 Drawing Sheets

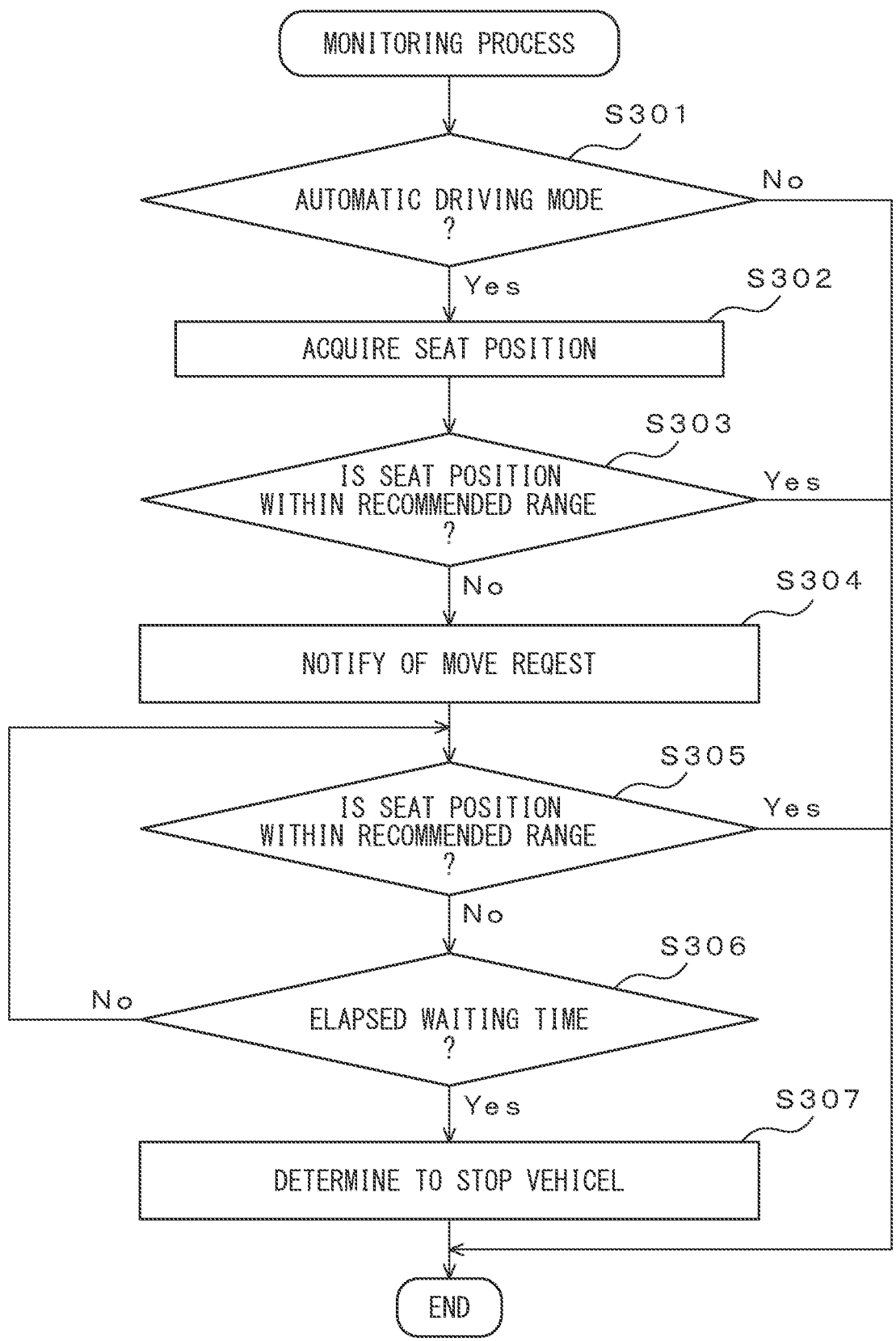

MONITORING SYSTEM, STORAGE MEDIUM STORING COMPUTER PROGRAM FOR MONITORING AND METHOD FOR MONITORING

FIELD

The present disclosure relates to a monitoring system, a storage medium storing a computer program for monitoring and a method for monitoring.

BACKGROUND

An automatic control system mounted on a vehicle may control the vehicle at a different level of automatic operation, depending on the decision of the automatic control system or a driver. In the automatic control system, the driver is the primary controller of the vehicle when the vehicle is operated under the so-called automatic operation level 2 or less.

On the other hand, the automatic control system is the primary controller of the vehicle under the so-called automatic operation level 3. Therefore, the driver can adjust the seat position so as to, for example, adopt a relaxed posture during operation of the vehicle under the automatic driving level 3.

Even at the time of operation of the vehicle under the automatic operation level 3, the automatic control system notifies the driver of the control transfer demand requesting for transferring the primary controller of the vehicle from the automatic control system to the driver, when it is determined that the vehicle cannot be safely operated by the automatic control (for example, Japanese Unexamined Patent Publication No. 2017-94963). The driver begins operation of the vehicle in response to this control transfer demand.

SUMMARY

Therefore, the automatic control system monitors the driver as to whether the driver is in a condition capable of starting the operation of the vehicle according to the control transfer demand when the operation of the vehicle is the automatic control. The automatic control system notifies the driver to adjust the position of the driver's seat within the recommended range when the position of the driver's seat is not within the recommended range capable of driving the vehicle.

However, when the control transfer demand is notified to the driver in a visually recognizable manner in a state that the seat position is moved backward so that the driver can take a relaxed posture and, the driver may not visually recognize the control transfer demand. Also, when the control transfer demand is notified to the driver in an audibly recognizable manner, the driver may not hear the notification correctly since the control transfer demand is mixed with other sound.

It is an object of the present disclosure to provide a monitoring system in which a move request requesting to adjust the seat position within the recommended range is reliably notified to a driver when the position of the driver's seat is not within the recommended range.

(1) According to one embodiment, a monitoring system is provided, and which has a notifying unit capable of notifying a driver of information in a tactually recognizable manner, and a processor configured to determine whether the position of a driver's seat in which a driver is sitting is within a recommended range that represents an extent of the seat position where the driver sitting in the driver's seat can drive a vehicle, and notify the driver of a move request requiring to adjust the seat position within the recommended range through the notifying unit based on the determination that the seat position is not within the recommended range.

(2) In the monitoring system of (1), it is preferable that the notifying unit be capable of vibrating or displacing a seating surface of the driver's seat to notify the driver of the move request.

(3) In the monitoring system of (1) or (2), it is preferable that the notifying unit be capable of varying tension on the seat belt of the driver's seat to notify the driver of the move request.

(4) In any monitoring system of (1) to (3), it is preferable that the processor is further configured to determine to stop the vehicle based on the determination that the seat position is not within the recommended range after a predetermined period has elapsed subsequently to the notification of the move request.

(5) In any monitoring system of (1) to (4), it is preferable that the vehicle have an automatic driving mode in which the vehicle is mainly controlled by an automatic control device and a manual driving mode in which the vehicle is mainly controlled by the driver, and the processor is further configured to determine whether the seat position is within the recommended range when the vehicle is in the automatic driving mode.

(6) In any monitoring system of (1) to (5), it is preferable that the processor is further configured to determine a state of the driver when the position of the driver's seat is within the recommended range based on information representing the state of the driver.

(7) According to another embodiment, a storage medium storing a computer program for monitoring is provided. This computer program causes a processor to execute a process, and the process includes determining whether a seat position of a driver's seat in which a driver is sitting is within a recommended range that represents an extent of the seat position where the driver sitting in the driver's seat can drive a vehicle, and notifying the driver of a move request requiring to adjust the seat position within the recommended range through a notifying unit capable of notifying the driver of information in a tactually recognizable manner based on the determination that the seat position is not within the recommended range.

(8) According to still another embodiment, a monitoring method carried out by a monitoring device is provided. This monitoring method includes determining whether a seat position of a driver's seat in which a driver is sitting is within a recommended range that represents an extent of the seat position where the driver sitting in the driver's seat can drive a vehicle, and notifying the driver of a move request requiring to adjust the seat position within the recommended range through a notifying unit capable of notifying the driver of information in a tactually recognizable manner based on the determination that the seat position is not within the recommended range.

According to the monitoring system of the present disclosure, the move request can be reliably communicated to the driver since the monitoring system notifies the driver of the move request in a tactual manner when the seat position of the driver's the seat is not within the recommended range.

The object and advantages of the invention will be realized and attained by means of the elements and combinations particularly specified in the claims. It should be understood that both the foregoing general description and the following detailed description are exemplary and explanatory, and are not restrictive of the invention as claimed.

BRIEF DESCRIPTION OF DRAWINGS

FIG. 5 is another example of an operation flow chart for the monitoring process of the monitoring system of the present embodiment.

DESCRIPTION OF EMBODIMENTS

Figure 1A:
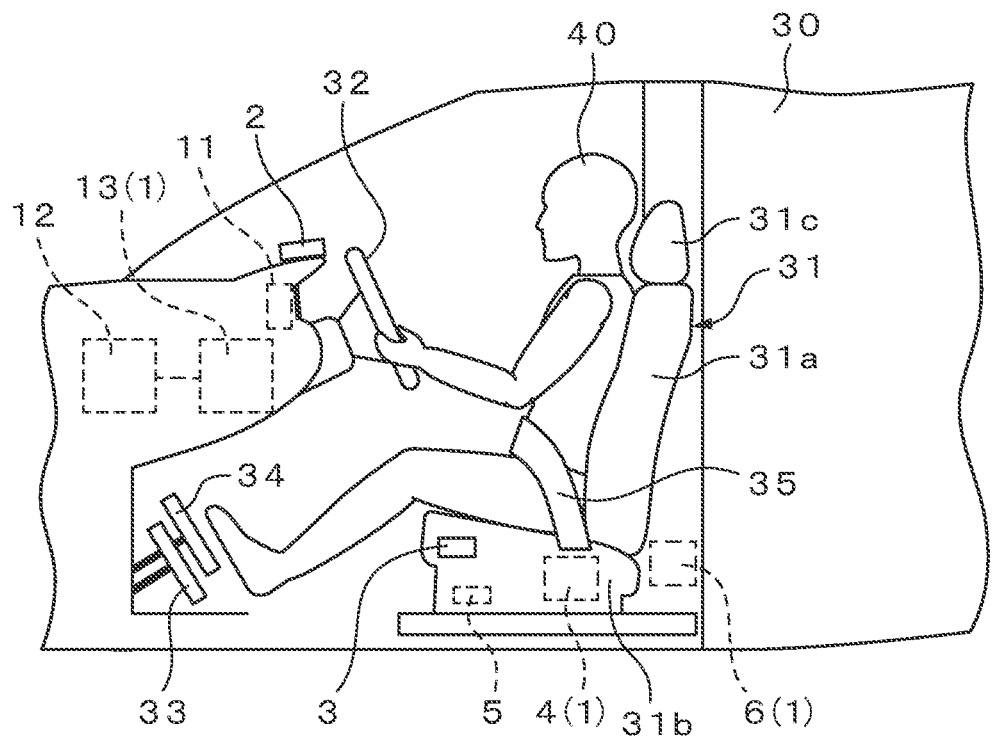
FIG. 1A is a diagram illustrating general operation of a monitoring system of the present embodiment and showing a seat position of a driver's seat at the time of the manual driving mode.
Figure 1B:
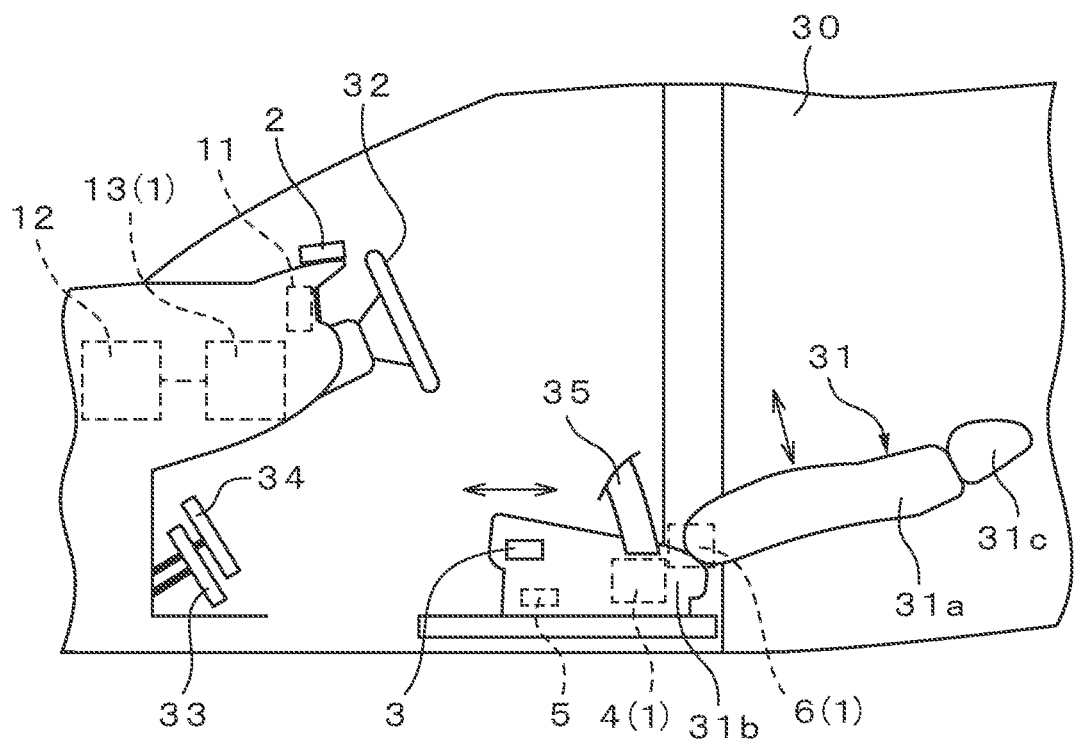
FIG. 1B is a diagram illustrating general operation of the monitoring system of the present embodiment and showing a seat position of the driver's seat at the time of the automatic driving mode.

FIG. 1A and FIG. 1B are diagrams illustrating general operation of a monitoring system of the present embodiment. Referring to FIG. 1A and FIG. 1B, a general outline of the operation of the monitoring system of the present embodiment will be described below.

As shown in FIG. 1A, the vehicle 10 has a monitoring system 1 including an automatic control device 12 and a monitoring device 13. The automatic control device 12 has an automatic driving mode for driving the vehicle 10 controlled primarily by the automatic control device 12, and a manual driving mode for driving the vehicle 10 controlled primarily by the driver 40. In the manual driving mode, the automatic control device 12 controls the operation of the vehicle 10 based on the operation of the driver 40. The monitoring system 1 has a seat drive unit 4, a seat belt drive unit 6 and a monitoring device 13. The vehicle 10 may be an autonomous vehicle.

FIG. 1A shows 1 a seat position of the driver's seat 31 in the vehicle compartment 30 at the time of the manual driving mode. The driver 40 operates the seat operation unit 3 to adjust the position of the driver's seat 31. Under the manual driving mode, the driver 40 sits on the driver's seat 31 and adjusts the driver's seat 31 to a seat position where the driver 40 is operable with the steering wheel 32, the brake pedal 33 and the accelerator pedal 34.

FIG. 1B shows a seat position of the driver's seat 31 in the vehicle compartment 30 at the time of the automatic driving mode. In the automatic driving mode, the driver 40 can sit on the driver's seat 31 in a relaxed posture. For example, the driver 40 can operate the seat operation unit 3 to adjust the position of the driver's seat 31 backward and sit on the driver's seat 31 to lie on his/her back.

Even at the time that the vehicle 10 is operated under the automatic driving mode, when it is determined that the vehicle 10 cannot be safely operated by the automatic control, the automatic control device 12 notifies the driver 40 of the control transfer demand that requires the primary controller of driving of the vehicle 10 to be transferred from the automatic control device 12 to the driver 40.

The monitoring device 13 monitors the position of the driver's seat 31 whether the driver 40 is within the recommended range capable of the manual driving under of the automatic driving mode. When the position of the driver's seat 31 is not within the recommended range where the driver 40 can drive the vehicle 10 manually, the monitoring device 13 notifies the driver 40 of the move request requesting for adjusting the position of the driver's seat 31 within the recommended range.

The move request can be notified to the driver 40 as display information through user interface (UI) 11, but as shown in FIG. 1B, when the position of the driver's seat 31 is positioned rearward, the driver 40 may not be able to see the displayed information displayed on UI 11.

In addition, the move request can be notified to the driver 40 as audio information through the UI 11, but the driver 40 may not be able to hear the notification correctly due to the move request being mixed with other sound in the vehicle compartment 30 while traveling.

Therefore, the monitoring device 13 notifies the driver 40 of the move request requesting to adjust the position of the driver's seat 31 within the recommended range in a tactually recognizable manner. For example, the monitoring device 13 vibrates or adjusts the seating surface of the driver's seat 31 to notify the driver of the move request. The monitoring device 13 may also vary the tension on the seat belt 35 of the driver's seat 31 to notify the driver 40 of the move request.

Thus, the driver 40 can recognize the notification of the move request even when the driver is seated on the driver's seat 31 by adjusting the position of the driver's seat 31 backward to lie on his/her back. Then, the driver 40 adjusts the position of the driver's seat 31 within the recommended range.

As described above, the monitoring system 1 of the present embodiment can reliably notify of the move request requesting to move the seat position within the recommended range to the driver 40, since the monitoring system 1 notifies the driver 40 of the move request in a tactual manner when the position of the driver's seat 31 is not within the recommended range.

Figure 2:
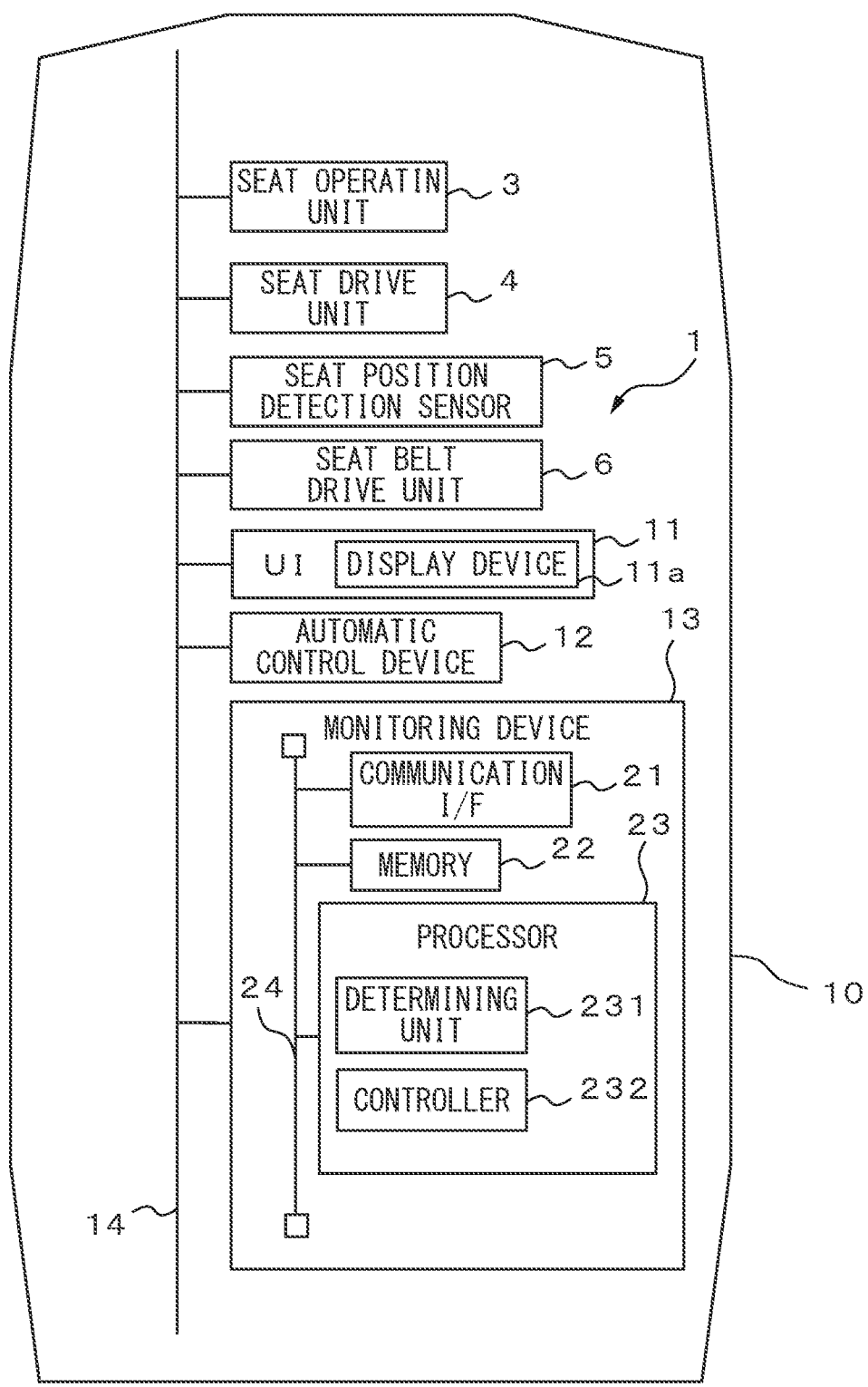
FIG. 2 is a general schematic drawing of a vehicle in which the monitoring system of the present embodiment is mounted.

FIG. 2 is a general schematic drawing of the vehicle 10 in which the monitoring system 1 of the present embodiment is mounted. Vehicle 10 has a seat operation unit 3, a seat drive unit 4, a seat position detection sensor 5, a seat belt drive unit 6, a user interface (UI) 11, the automatic control device 12, and the monitoring device 13, etc. The monitoring system 1 has at least the seat drive unit 4, the seat belt drive unit 6 and the monitoring device 13.

The seat operation unit 3, the seat drive unit 4, the seat position detection sensor 5, the seat belt drive unit 6, UI 11, the automatic control device 12, and the monitoring device 13 are communicatively connected through an in-vehicle network 14 conforming to the Controller Area Network standard.

The driver's seat 31 has a seat back 31a, a seat cushion 31b, and a headrest 31c. The tilt angle of the seat back 31a is discretely adjustable in ten levels. The front-back direction of the seat cushion 31b is discretely adjustable in ten levels. In this specification, the position of the driver's seat 31 is meant to include tilt (tilt angle) and position of each part of the driver's seat 31.

The seat operation unit 3 is operated by the driver 40 to output an operating signal representing a position of the driver's seat 31 to be adjusted to the seat drive unit 4. The seat drive unit 4 adjusts the driver's seat 31 based on the operating signal. The seat operation unit 3 has switches to operate each of the seat back 31a and seat cushion 31b.

The seat drive unit 4 includes a drive device, such as a motor, for displacing the seat back 31a and seat cushion 31b. In FIG. 1A and FIG. 1B, the seat drive unit 4 is arranged in the seat cushion 31b, but the seat drive unit 4 may be arranged in a distributed manner on each of the seat back 31a and seat cushion 31b. The seat drive unit 4 can also be controlled by the monitoring device 13 to vibrate or adjust the seating surfaces of the seat back 31a and the seat cushion 31b of the driver's seat 31.

The seat position detection sensor 5 detects the tilt or position of each part of the driver's seat 31. The seat position detection sensor 5 detects the tilt of the seat back 31a and outputs tilt information representing the tilt of the seat back 31a to the monitoring device 13. The tilt information represents one of the ten levels showing the tilt of the seat back 31a. The seat position detection sensor 5 also detects the position of the front-back direction of the seat cushion 31b and outputs position information representing the position of the front-back direction of the seat cushion 31b to the monitoring device 13. The position information represents one of the ten levels showing the position of the seat cushion 31b. The tilt information and the position information are exemplary the seat position information representing the position of the driver's seat 31 in which the driver 40 driving the vehicle 10 sits on.

The seat position detection sensor 5 may include a sensor that detects the tilt or position of the seat back 31a and seat cushion 31b mechanically, optically, or magnetically. In FIG. 1A and FIG. 1B, the seat position detection sensor 5 is arranged in the seat cushion 31b. The seat position detection sensor 5 may be dispersed in each of the seat back 31a and seat cushion 31b.

The seat belt drive unit 6 is controlled by the automatic control device 12 to adjust the tension on the seat belt 35 worn by the driver 40 to a predetermined level. Under the automatic driving mode, the seat belt drive unit 6 is controlled by the automatic control device 12 to allow the driver 40 to loosen the tension of the seat belt 35 within a predetermined range. The seat belt drive unit 6 is also controlled by the monitoring device 13 to vary the tension of the seat belt 35.

The UI 11 is an example of a notification unit. The UI 11 is controlled by the automatic control device 12 or the monitoring device 13 to notify the driver 40 of information regarding the vehicle 10, such as the control transfer demand. The UI 11 has a display device 11a such as a liquid crystal display, a head-up display, or a touch panel for displaying the control transfer demand, etc. The UI 11 may also include a sound-output device (not shown) for notifying the driver 40 of the control transfer demand, etc. The UI 11 includes, for example, a touch panel or an operation button as an input device for inputting operation information from the driver 40 to the vehicle 10. As for an operation information, the control transfer demand which the driver 40 requires the automatic control device 12 to transfer the control of the vehicle 10 is included. The UI 11 outputs the input operating information to the automatic control device 12, etc., through the vehicle network 14.

The automatic control device 12 controls the operation of the vehicle 10. The automatic control device 12 has the automatic driving mode for driving the vehicle 10 controlled primarily by the automatic control device 12, and the manual driving mode for driving the vehicle 10 controlled primarily by the driver 40. The automatic control device 12 controls the operation of steering, driving, braking, etc., under the automatic driving mode based on the detection information, etc., of the sensors mounted on the vehicle 10 (not shown). Driving the vehicle 10 primarily controlled by the automatic control device 12 means that the automatic control device 12 controls the steering, driving, and braking operations without involving the driver 40. Driving the vehicle 10 primarily controlled by the driver 40 means that the driver 40 is involved in the control of at least one operation of steering, driving, and braking.

The automatic control device 12 controls the operation of the vehicle 10 such as a steering, driving, braking based on the manipulation of the driver 40 under the manual driving mode. The automatic control device 12 controls the operation of the vehicle 10 based on the operation of at least one of the steering wheel 32, the brake pedal 33, or the accelerator pedal 34 by the driver 40 under the manual driving mode.

The automatic control device 12 may have a plurality of automatic driving levels under the automatic driving mode. In this specification, the plurality of the automatic driving levels may include the automatic driving level of the so-called levels 3 to 5. At the automatic driving level 3, the automatic control device 12 corresponds to an autonomous driving device and the vehicle 10 corresponds to a conditional autonomous driving vehicle. At the automatic driving level 4, the automatic control device 12 corresponds to an automatic operation device, and the vehicle 10 corresponds to an autonomous driving vehicle. At the automatic driving level 5, the automatic control device 12 corresponds to an autonomous driving device and the vehicle 10 corresponds to a fully autonomous driving vehicle. Also, in this specification, the manual control mode may include the so-called level 0 to 2 automatic driving level.

At the time of the automatic driving mode, the automatic control device 12 outputs mode information representing that operation of the vehicle 10 is under the automatic driving mode to the monitoring device 13 through the in-vehicle network 14. In addition, at the time of the manual driving mode, the automatic control device 12 outputs the mode information representing that the operation of the vehicle 10 is under the manual driving mode to the monitoring device 13 though the in-vehicle network 14.

The automatic control device 12 detects an object such as another vehicle around the vehicle 10 based on the detection information of the sensors (not shown) mounted on the vehicle 10. When it is impossible to maintain a predetermined distance or more between the vehicle 10 and other object under the automatic driving mode, the automatic control device 12 notifies the driver 40 through UI 11 of the control transfer demand that requests to transfer the primary controller of the vehicle 10 from the automatic control device 12 to the driver 40. In addition, under the automatic driving mode, the automatic control device 12 notifies the driver 40 through UI 11 of the control transition demand requesting that the driving be transferred from the automatic control device 12 to the driver 40 before entering an area where the driving under the automatic driving mode is not allowed. Areas where operation under the automatic driving mode is not allowed include area without high-precision map. Further, under the automatic driving mode, the automatic control device 12 notifies the driver 40 through UI 11 of the control transfer demand when it is determined that the driving of the vehicle 10 cannot be safely controlled due to an error such as a sensor or the like.

The automatic control device 12 carries out the transition of the control of the vehicle 10 to transfer the control to the driver 40 within a predetermined control transfer time from the time of notifying the control transition demand to the driver 40. When the approval operation of the driver 40 to the control transfer demand cannot be confirmed within the control transfer time, the automatic control device 12 safely stops the vehicle 10 (Minimal Risk Maneuver process). The automatic control device 12, for example, transfers the control of the vehicle 10 to the driver 40 when recognizing any one of the following three driver's approval operation: (1) the driver 40 is holding the steering wheel 32 and operating the accelerator pedal 34, (2) the driver 40 is holding the steering wheel 32 and operating the brake pedal 33, and (3) the driver 40 is holding the steering wheel 32 and operating the steering wheel 32.

In the automatic driving mode, the driver 40 may notify the automatic control device 12 through UI 11 of the control transfer demand requesting the automatic controller 12 to transfer the primary controller of driving of the vehicle 10 from the automatic controller 12 to the driver 40. Thus, the driving mode of the vehicle 10 can be transferred from the automatic driving mode to the manual driving mode.

In addition, in the manual driving mode, the driver 40 may notify the automatic control device 12 of the control transfer demand requesting the automatic control device 12 to transfer the primary controller of driving of the vehicle 10 from the driver 40 to the automatic control device 12 through UI 11. Thus, the driving mode of the vehicle 10 can be transferred from the manual driving mode to the automatic driving mode.

The automatic control device 12 outputs an automatic operation start information representing the start the operation of the automatic driving mode to the monitoring device 13 only during a predetermined notification period at the time of starting the operation in the automatic driving mode.

The monitoring device 13 carries out a decision process and control process. For this purpose, the monitoring device 13 has a communication interface (IF) 21, memory 22, and processor 23. The communication interface 21, the memory 22, and the processor 23 are connected through signal wires 24. The communication interface 21 has an interface circuitry for connecting the monitoring device 13 to the in-vehicle network 14.

The memory 22 is an example of a storage unit, and the memory 22 has a volatile semiconductor memory and a non-volatile semiconductor memory, for example. The memory 22 stores application computer programs and various data to be used for information processing carried out by the processor 23.

All or some of the functions of the monitoring device 13 are functional modules implemented, for example, by a computer program executed by the processor 23. The processor 23 has a determining unit 231 and a controller 232. Alternatively, the functional module of the processor 23 may be a dedicated arithmetic circuit provided in the processor 23. The processor 23 has one or more CPUs (Central Processing Unit) and its peripheral circuitry. The processor 23 may further has other operational circuitry, such as a logic unit, a numerical unit, or a graphic processing unit. The monitoring device 13 is, for example, an electronic control unit (Electronic Control Unit: ECU). The detailed operation of the monitoring device 13 will be described later.

In FIG. 2, the automatic control device 12 and the monitoring device 13 are described as separate devices (e.g., Electronic Control Unit: ECU), although all these devices may be configured as a single device.

Figure 3:
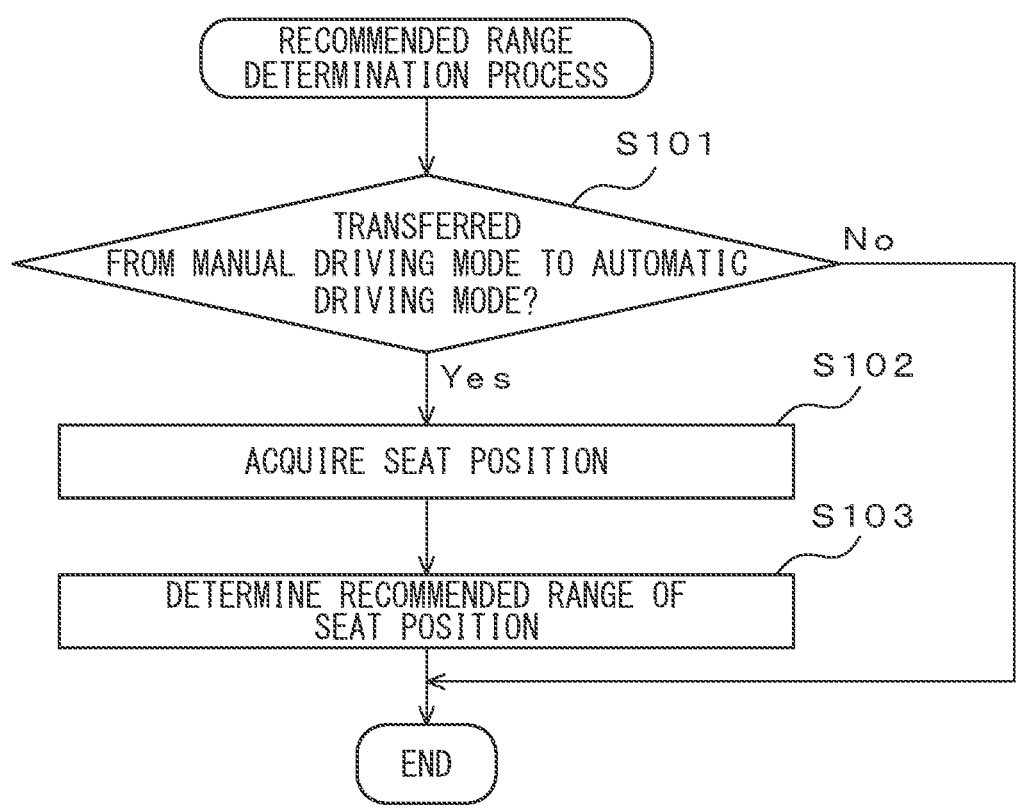
FIG. 3 is an example of an operation flow chart for the recommended range determination process of the monitoring system of the present embodiment.

FIG. 3 is an example of an operation flow chart for the recommended range determination process of the monitoring system 1 of the present embodiment. Referring to FIG. 3, the recommended range determination process of the monitoring system 1 will be described below. The monitoring system 1 carries out the recommended range determination process according to the operation flow chart shown in FIG. 3 at the recommended range determination time having a predetermined period.

The cycle of the recommended range determination process is preferably executed shorter than the notification period of the automatic operation start information output from the automatic control device 12. Thus, the monitoring device 13 can recognize the automatic operation start information output from the automatic control device 12.

First, the determining unit 231 determines whether the operation of the vehicle 10 has been transferred from the manual driving mode to the automatic driving mode (step S101). When the automatic operation start information is input to the monitoring device 13, it means that the operation of the vehicle 10 is transferred from the manual driving mode to the automatic driving mode, and the operation of the vehicle 10 under the automatic driving mode has been started.

When the automatic operation start information is input, the determining unit 231 determines that the operation of the vehicle 10 has been transferred from the manual driving mode to the automatic driving mode. On the other hand, when the automatic operation start information is not input, the determining unit 231 determines that the operation of the vehicle 10 is not transferred from the manual driving mode to the automatic driving mode.

When the operation of the vehicle 10 has been transferred from the manual driving mode to the automatic driving mode (step S101—Yes), the determining unit 231 acquires the position of the driver's seat 31 (step S102). It is estimated that the position of the driver's seat 31 at the time when the driving of the vehicle 10 under the automatic driving mode is started represents the position of the driver's seat 31 at the time of the manual driving mode. The determining unit 231 acquires the tilt information representing the tilt of the seat back 31a and the position information representing the position of the front-back direction of the seat cushion 31b.

The determining unit 231 determines the recommended range of the position of the driver's seat 31 based on the position of the driver's seat 31 at the time when the operation of the vehicle 10 under the automatic driving mode has started (step S103), and the series of processing steps is complete.

The seat position of the recommended range of the driver's seat 31, is used to assess the position of the driver's seat 31 at the time of the automatic driving mode in the monitoring process to be described later. When the position of the driver's seat 31 is within the recommended range, it is estimated that the driver 40 can operate the steering wheel 32, the brake pedal 33, and the accelerator pedal 34.

The determining unit 231 determines the recommended range of the tilt of the seat back 31a based on the tilt information representing the tilt of the seat back 31a at the time when the operation of the vehicle 10 under the automatic driving mode has started (hereinafter, also referred to as starting tilt information). The tilt information is expressed as a number between 1 and 10. The smaller the number, the smaller the tilt of the seat back 31a. For example, the determining unit 231 determines the numerical value range represented between a number represented by the starting tilt information and a value larger than the starting tilt information by three numerical values as the recommended range of the tilt.

The determining unit 231 also determines the recommended range of the position of the front-back direction of the seat cushion 31b based on the position information representing the position of the front-back direction of the seat cushion 31b at the time when the operation of the vehicle 10 under the automatic driving mode has started (hereinafter also referred to as starting position information). The position information is expressed as a number between 1 and 10. The smaller the number, the more the seat cushion 31b is located front side (a position toward the steering wheel 32 side). For example, the determining unit 231 determines the numerical value range between a number represented by the starting position information and a value larger than the starting position information by three numerical values as the recommended range of the position of the front-back direction.

On the other hand, when the operation of the vehicle 10 has not transferred from the manual driving mode to the automatic driving mode (step S101—No), the series of processing steps is complete.

Figure 4:
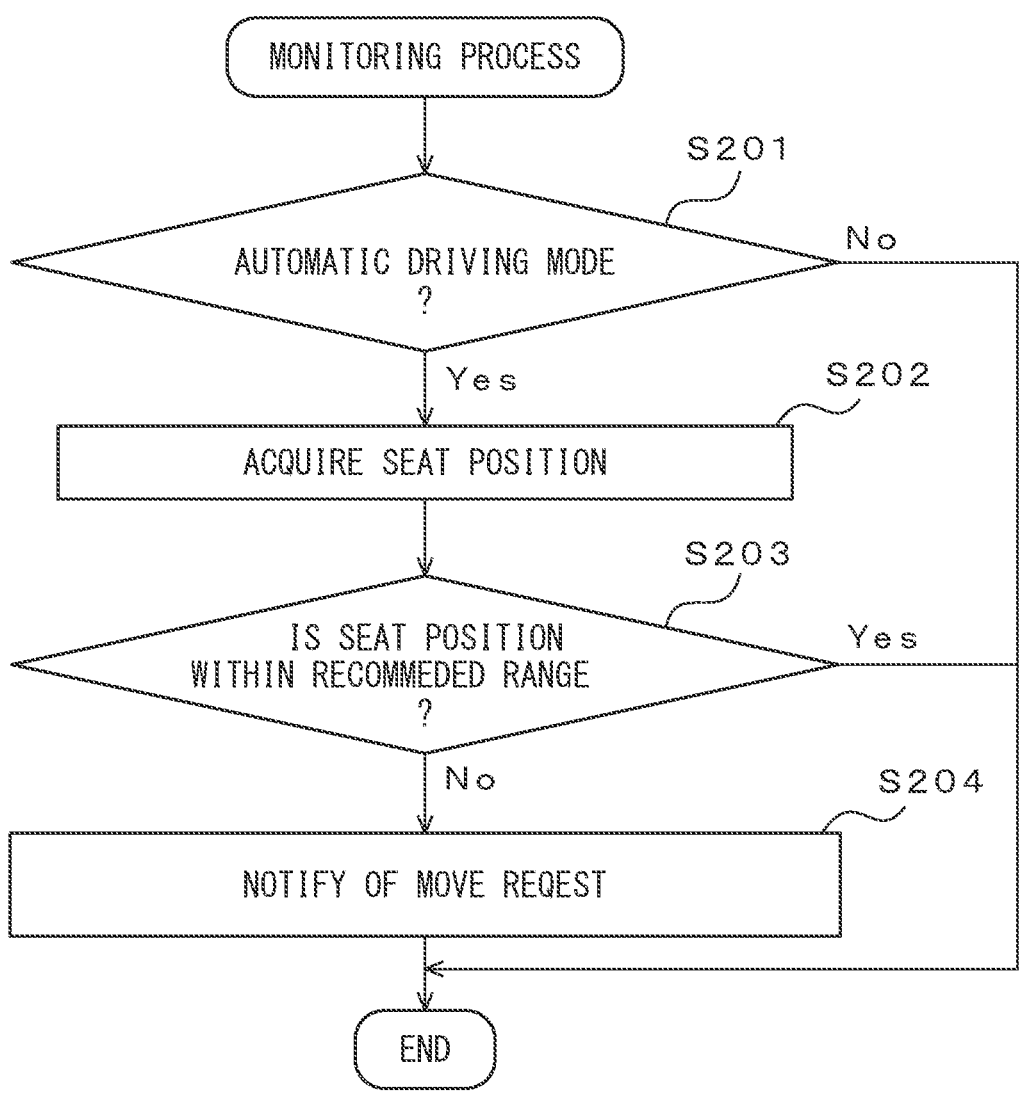
FIG. 4 is an example of an operation flow chart for the monitoring process of the monitoring system of the present embodiment.

FIG. 4 is an example of an operation flow chart for the monitoring process of the monitoring system 1 of the present embodiment. Referring to FIG. 4, the monitoring process of the monitoring system 1 will be described below. The monitoring system 1 carries out the monitoring process according to the operation flow chart shown in FIG. 4 at the monitoring time having a predetermined period. The period of the monitoring time, for example, can be 1 to 30 seconds.

First, the determining unit 231 determines whether the operation of the vehicle 10 is the automatic driving mode (step S201). The determining unit 231 determines that the operation of the vehicle 10 is the automatic driving mode when the mode information representing the automatic driving mode is input. On the other hand, the determining unit 231 determines that the operation of the vehicle 10 is not the automatic driving mode when the mode information representing the manual driving mode is input. The determining unit 231 is an exemplary the seat position determining unit.

When the operation of the vehicle 10 is the automatic driving mode (step S201—Yes), the determining unit 231 acquires the position of the driver's seat 31 (step S202). The determining unit 231 acquires the tilt information representing the tilt of the seat back 31a and the position information representing the position of the front-back direction of the seat cushion 31b.

Next, the determining unit 231 determines whether the position of the driver's seat 31 under the automatic driving mode is within the recommended range based on the tilt information and the position information of the position of the driver's seat 31 (step S203). As shown in FIG. 1B, when the operation of the vehicle 10 under the automatic driving mode has started, the driver 40 may adjust the position of the driver's seat 31 to sit on the driver's seat 31 in a relaxed posture. Therefore, the present seat position of the driver's seat 31 may not be within the recommended range.

The determining unit 231 determines that the tilt of the seat back 31a of the driver's seat 31 is within the recommended range when the tilt information representing the present tilt of the seat back 31a is within the recommended range. On the other hand, the determining unit 231 determines that the tilt of the seat back 31a of the driver's seat 31 is not within the recommended range when the tilt information representing the present tilt of the seat back 31a is not within the recommended range.

The determining unit 231 also determines that the position of the front-back direction of the seat cushion 31b is within the recommended range when the position information representing the present position of the front-back direction of the seat cushion 31b is within the recommended range. On the other hand, the determining unit 231 determines that the position of the front-back direction of the seat cushion 31b is not within the recommended range when the position information representing the present position of the front-back direction of the seat cushion 31b is not within the recommended range.

The determining unit 231 determines that the position of the driver's seat 31 is within the recommended range (step S203—Yes), and the series of the processing is complete, when the tilt information is within the recommended range and the position information is within the recommended range.

On the other hand, the determining unit 231 determines that the position of the driver's seat 31 is not within the recommended range when at least one of the tilt information and the position information is not within the recommended range.

When the position of the driver's seat 31 is not within the recommended range (step S203—No), the controller 232 notifies the driver 40 of the move request requesting to adjust the position of the driver's seat 31 within the recommended range through the notifying unit that can notify the driver of information in a tactually recognizable manner (step S204), and the series of the processing is complete. The seat drive unit 4 and the seat belt drive unit 6 are exemplary the notifying units that can notify the driver 40 in the tactually recognizable manner. The controller 232 is an exemplary the notifying control unit. The duration that the controller 232 notifies the driver 40 of the move request is preferably about 3 to 10 seconds from the viewpoint of reliably recognizing the move request to the driver 40.

Notifying the driver in the tactually recognizable manner means that an external force or temperature change that is perceivable by the driver is applied to the driver 40. As the external force, feeling, pressure or vibration can be used. In the present embodiment, pressure or/and vibration is used as the external force, and the seat drive unit 4 or/and the seat belt drive unit 6 are used as the notifying unit.

For example, the controller 232 uses the seat drive unit 4 to vibrate or adjust the seating surface of the seat cushion 31b of the driver's seat 31 to notify the driver 40 of the move request. The controller 232 may cause the driver 40 to reliably recognize the move request by periodically vibrating the seating surface of the seat cushion 31b. Further, it is preferable that the amount of adjustment to adjust the seating surface of the seat cushion 31b is a size exceeding the adjustment that is recognized by the driver 40 seated in the driver's seat 31 during normal traveling of the vehicle 10. For example, the adjustment amount to adjust the seating surface of the seat cushion 31b can be 1 to 3 cm.

The controller 232 may also use the seat belt drive unit 6 to vary the tension of the seat belt 35 of the driver's seat 31 to notify the driver 40 of the move request. The controller 232 may cause the driver to reliably recognize the move request by periodically changing the tension of the seat belt 35.

In addition, the controller 232 may notify the driver 40 of the move request and use the display device 11a of the UI 11 to indicate "Return the driver's seat position to a position where the vehicle can be operated." Alternatively, the controller 232 may use the display device 11a of the UI 11 to indicate that "The driver's seat is adjusted too much."

Here, the controller 232 may display "Return the tilt of the driver's seat to a position where the vehicle can be operated" using the display device 11a of the UI 11, when the tilt information is not within the recommended range. In addition, the controller 232 may indicate "Return the driver's seat position to a position where the vehicle can be operated" using the display device 11a of the UI 11 when the position information is not within the recommended range.

The driver 40 notified of the move request operates the seat operation unit 3 to adjust the position of the driver's seat 31 within the recommended range. This allows the driver 40 to begin the operation of the vehicle 10 under the manual driving mode within the control transfer time after the control transfer demand is notified.

On the other hand, when the operation of the vehicle 10 is not the automatic driving mode (step S201—No), the series of processing is complete.

As described above, the monitoring system of the present embodiment can reliably notify of the move request requesting to adjust the seat position within the recommended range to the driver, since the monitoring system notifies the driver of the move request in the tactual manner when the position of the driver's seat is not within the recommended range.

Next, another exemplary operation of the monitoring process by the monitoring system 1 will be described below with reference to FIG. 5. FIG. 5 is another example of an operation flow chart for the monitoring process of the monitoring system 1 of the present embodiment.

The monitoring process shown in FIG. 5 differs from the monitoring process shown in FIG. 4 in that the process of steps S305 to S307 is added. The processing of the steps S301 to S304 of the monitoring processing shown in FIG. 5 is the same as the processing of the steps S201 to S204 of the monitoring process shown in FIG. 4.

In this process, after the move request requesting for adjusting the position of the driver's seat 31 within the recommended range is notified to the driver 40 (step S304), the determining unit 231 determines whether the position of the driver's seat 31 is within the recommended range (step S305).

When the position of the driver's seat 31 is not within the recommended range (step S305—No), it is determined whether a predetermined waiting time has elapsed after the notification of the move request (step S306). The predetermined time may be, for example, 30 to 180 seconds.

When the waiting time has not elapsed (step S306—No), the process returns to step S305. On the other hand, when the waiting time has elapsed (step S306—Yes), the controller 232 determines to stop the vehicle 10 (step S307), and the series of processing is complete. The controller 232 is an exemplary the operation control unit.

When the waiting time has elapsed after the notification of the move request and the driver 40 has not adjusted the position of the driver's seat 31 within the recommended range, there is a possibility that an abnormality has occurred in the driver 40. Therefore, the controller 232 determines to stop the vehicle 10.

The controller 232 issues a stop request to stop the vehicle 10 to the automatic control device 12 through the in-vehicle network 14. The automatic control device 12 safely stops the vehicle 10 (Minimal Risk Maneuver process). Thus, the monitoring device 13 can prevent the vehicle 10 from continuing to travel when an abnormality has occurred in the driver 40.

On the other hand, when the position of the driver's seat 31 is within the recommended range (step S305—Yes), the series of processing is complete.

The monitoring system, computer program for monitoring and method for monitoring according to the embodiments described in the present disclosure may incorporate appropriate modifications that still fall within the gist of the disclosure. Moreover, the technical scope of the disclosure is not limited to these embodiments and includes the invention and its equivalents as laid out in the claims.

For example, in the embodiment described above, the driver was notified of the move request tactilely using the driver's seat surface or seat belt, but the way to notify the driver of the move request is not limited thereto. For example, the velocity or temperature of the air stream sent from the air conditioner may be varied to notify the driver of the move request to the tactile sensations.

Further, when the position of the steering wheel of the vehicle is adjustable, the monitoring system may determine whether the position of the driver's seat is within the recommended range based on the relationship between the position of the steering wheel and the position of the driver's seat.

The vehicle 10 may also has a camera 2 capable of capturing an image of the driver 40 when the position of the driver's seat 31 is within the recommended range. The determining unit 231 of the monitoring device 13 may determine the state of the driver 40 based on camera images captured by the camera 2. The camera image is an example of information representing the state of the driver. For example, the determining unit 231 may determine to stop the vehicle 10 based on the determination that there is an anomaly in the driver 40.

The invention claimed is:
1. A monitoring system comprising:
a controller configured to notify a driver of information in a tactually recognizable manner; and
a processor configured to
determine whether a seat position of a driver's seat in which a driver is sitting is within a recommended range that represents an extent of the seat position where the driver sitting in the driver's seat can drive a vehicle,
notify the driver of a move request requiring to adjust the seat position within the recommended range through the controller based on the determination that the seat position is not within the recommended range, and
determine whether to stop the vehicle based on the determination that the seat position is not within the recommended range after a predetermined period has elapsed subsequently to the notification of the move request.
2. The monitoring system according to claim 1, wherein the controller is configured to vibrate or displace a seating surface of the driver's seat to notify the driver of the move request.
3. The monitoring system according to claim 1, wherein the controller is configured to vary tension on a seat belt of the driver's seat to notify the driver of the move request.
4. The monitoring system of claim 1, wherein the vehicle has an automatic driving mode in which the vehicle is mainly controlled by an automatic control device and a manual driving mode in which the vehicle is mainly controlled by the driver, and the processor is further configured to determine whether the seat position is within the recommended range when the vehicle is in the automatic driving mode.

5. The monitoring system of claim 1, wherein the processor is further configured to determine a state of the driver when the position of the driver's seat is within the recommended range based on information representing the state of the driver.

6. A computer-readable, non-transitory storage medium storing a computer program for monitoring, which causes a processor to execute a process, and the process comprising:
  determining whether a seat position of a driver's seat in which a driver is sitting is within a recommended range that represents an extent of the seat position where the driver sitting in the driver's seat can drive a vehicle; and
  notifying the driver of a move request requiring to adjust the seat position within the recommended range through a notifying unit capable of notifying the driver of information in a tactually recognizable manner based on the determination that the seat position is not within the recommended range; and
  determining whether to stop the vehicle based on the determination that the seat position is not within the recommended range after a predetermined period has elapsed subsequently to the notification of the move request.

7. A method for monitoring carried out by a monitoring device, and the method comprising:
  determining whether a seat position of a driver's seat in which a driver is sitting is within a recommended range that represents an extent of the seat position where the driver sitting in the driver's seat can drive a vehicle; and
  notifying the driver of a move request requiring to adjust the seat position within the recommended range through a notifying unit capable of notifying the driver of information in a tactually recognizable manner based on the determination that the seat position is not within the recommended range; and
  determining whether to stop the vehicle based on the determination that the seat position is not within the recommended range after a predetermined period has elapsed subsequently to the notification of the move request.

* * * * *